Sept. 8, 1953
T. STIEBEL
2,651,706
PORTABLE UTENSIL FOR FOOD AND
BEVERAGE PREPARATION BY HEAT
Filed Feb. 16, 1951
2 Sheets-Sheet 1
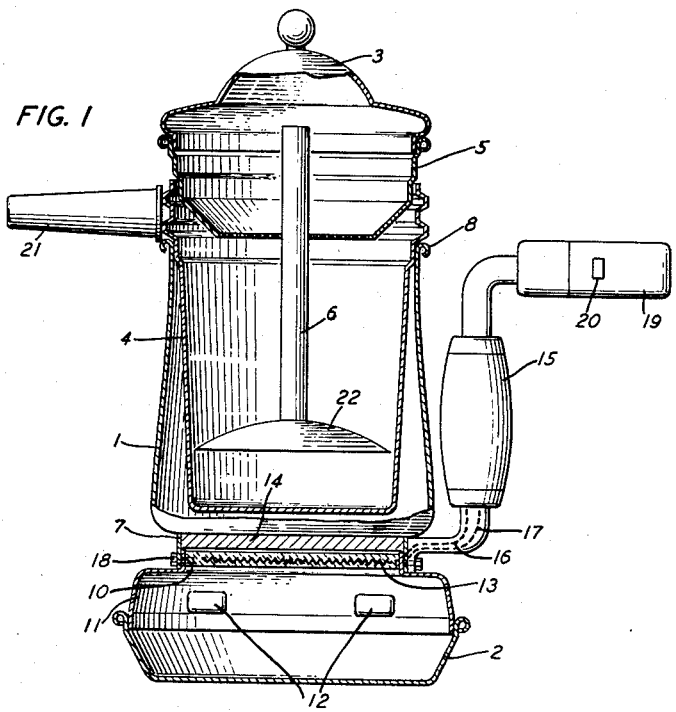
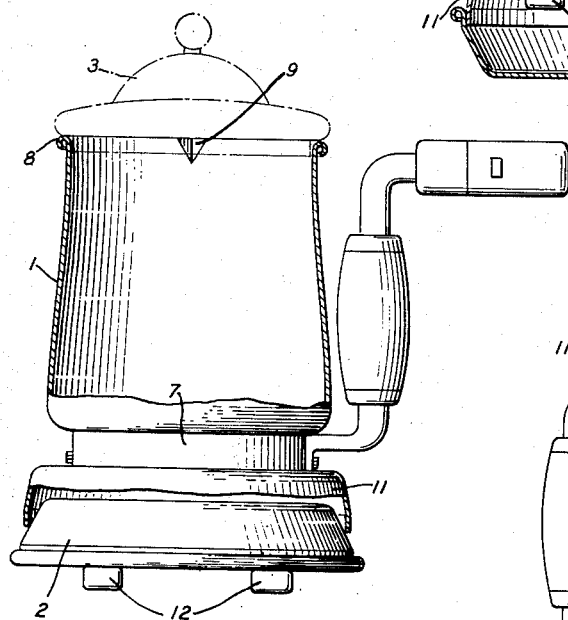
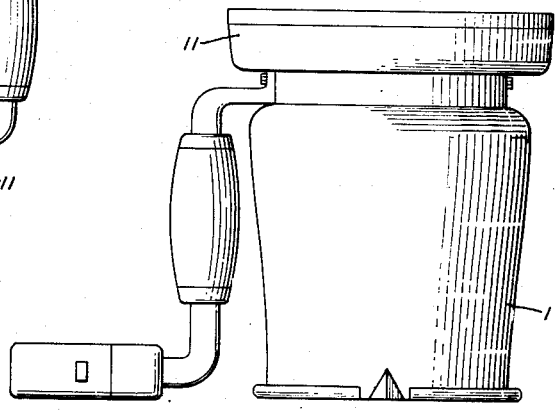
INVENTOR
THEODOR STIEBEL
BY
ATTORNEY Sept. 8, 1953     T. STIEBEL     2,651,706
PORTABLE UTENSIL FOR FOOD AND
BEVERAGE PREPARATION BY HEAT Filed Feb. 16, 1951     2 Sheets-Sheet 2

INVENTOR
THEODOR STIEBEL
BY
ATTORNEY

Patented Sept. 8, 1953

2,651,706

UNITED STATES PATENT OFFICE 2,651,706

PORTABLE UTENSIL FOR FOOD AND BEVERAGE PREPARATION BY HEAT

Theodor Stiebel, Holzminden, Weser, Germany

Application February 16, 1951, Serial No. 211,332

2 Claims. (Cl. 219—43)

This invention relates to a composite, portable food preparation utensil for heating and preparing food and beverages by all the different methods as may be called for.

An object of the invention is to provide a combined food preparation utensil electrically heated which is most conserving of space and hence particularly suitable for airplanes, boats and automobiles.

A further object is to provide a portable food preparation utensil of which the various parts are all adapted to fit into each other to permit of the assembly thereof as required or desired for the particular food preparation process employed at the time.

Still a further object is to provide a composite and portable food preparation utensil having an integral heater and permitting of baking by heat from above the material to be baked.

Still a further object of the invention is to provide a composite and portable food preparation utensil in which the volume of the main container is substantially equal to that of the cooking pot inesert therefor.

The foregoing and other objects of my instant invention appear from the following description when read in connection with the annexed drawings, in which:

Figure 1 is a vertical section through the portable food preparation utensil of my invention with all the parts used for the various food preparation alternatives assembled with the main body, as when packed for travelling, to occupy a minimum of space;

Figure 2 is a vertical section through the main body of my utensil with its heating element and the formed top and bottom containers for food preparation supported, with the main body upright, on the separate baking pan element in inverted position;

Figure 3 is a vertical section of the main body in inverted position, as when used for pan frying or roasting;

Figure 5:
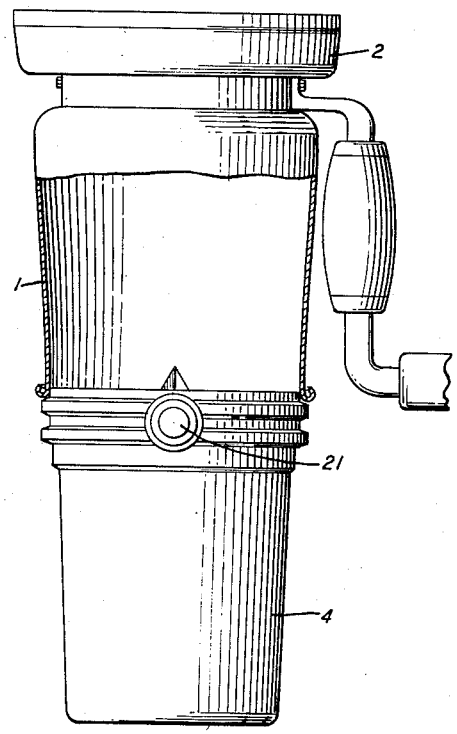
Figure 6:
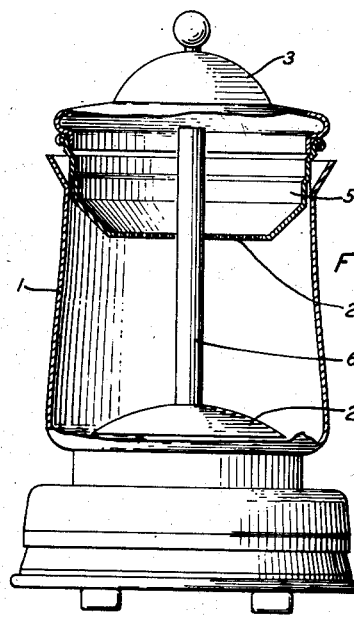

Figure 5 is a vertical section of the basic container in inverted position on the double boiler or pot insert in upright position, as these parts may be used to warm foods and beverages within the pot; and Figure 6 is a vertical section of the necessary parts of my portable utensil as assembled for the preparation by percolation of beverages such as coffee, supported on the inverted separate baking pan element.

The portable combination utensil of my invention for preparing foods and beverages by heat comprises essentially six parts—a basic container 1, a dish-shaped or pan element 2, a cover 3, a cooking or double boiler pot insert 4, a container 5 for material to be percolated, and the percolator tube 6. Each of the parts 2 to 6 is of such configuration that it may be fitted onto the basic container to cooperate therewith in one or more food preparation methods. In addition, the cover, the pot insert and the percolate container all fit each other.

Basic container 1 is a cylindrical container tapering outwardly toward its flat bottom. At the top, the basic container has a rolled rim 8 and is provided with two pouring lips or spouts 9. An annular ring or rim 7 is integral with the exterior of the bottom and is preferably of a smaller diameter than the diameter of the base of the container, and to this rim 7 there is affixed the rim 10 integral with an inverted dish-shaped pan 11. The dish-shaped pan 11 has a plurality of feet 12 of heat insulating material integral therewith. Within the rim 10, and hence also within rim 7, is housed the heating element 13 which has one or more heating stages. Above the heating element 13 a flat heat conductive plate 14 may be mounted which, when the container 1 is removed, may be used for flat frying. The rim 7 is engaged by the angularly bent handle 15, made of a non-heat conducting ceramic, through which the heater leads 16 and 17 pass, the leads passing through appropriate ports in the rims 7 and 10 for connection to the heater. Rims 7 and 10, handle 15 and the heater 13 are preferably, as shown in the illustrative embodiment, held rigidly together by screws 18. The handle 15 is again angularly bent at its top where it carries the electrical connector 19 of the utensil and the switch 20, and, if desired, a heat regulator, not shown, adapted to the number of heating stages in the heater 13. The regulator may be automatically and continuously operable. The top surface of the handle portion 19 is preferably coplanar with the rolled rim 8 of the basic container.

Figure 1 shows the separate pan 2 in its upright position fitted onto the lower rim of the inverted pan 11 integrally assembled with the basic container 1. The lower enclosure so formed may be used as a baking oven, with the heat from the heating element 13 applied to the food to be baked from above the food. When the separate pan 2 is inverted, and now as shown in Figure 2 for example, the inverted pan 11 integral with the basic container is fitted thereon, the pan 2 serves as a supporting pad. So positioned, and with the insert 4 and the percolator assembly 5, 6 removed, the basic container may be used for cooking of all types of fluids which may contain solid foods. Quicker cooking is obviously obtained by placing the cover 3 on the basic container as shown in the dashed lines in Figure 2.

In the position shown in Figure 3, the basic container rests on its rolled top rim 8 and the handle 15 serves as an additional stabilizing support for the container in such position. The integral inverted pan 11 is now uppermost and can be used as a frying or roasting pan.

Figure 4:
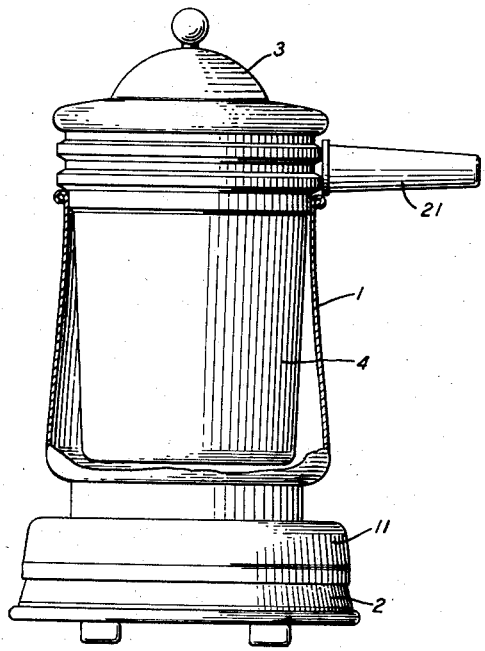
Figure 4 is a vertical section through the main body, assembled with the double boiler insert and the cover, and supported on the inverted separate baking pan element.

If milk or other readily scorchable or boilable material is to be heated, the pot insert 4 is supported on rim 8 and cover 3 placed on the pot as in Figure 4. Pot 4 is provided with its own handle 21 to permit of its ready use. I make the basic container 1 with a cylindrical wall tapering outwardly toward its bottom so that the volume thereof is but slightly larger than the volume of the pot insert 4. Thus the amount of water required in container 1 for double boiler heating is held to a minimum. Pot insert 4 may also serve as a bottom piece to the inverted basic container placed thereupon, as shown in Figure 5. This is a convenient mode of reheating foods or beverages which may already have been in pot 4, for which mode the slow heat stage of the heater, if the heater has stages, is used.

For preparing beverages by percolation, the percolating elements, namely the tube 6 with the deflector plate 22 attached at its bottom region and the insert 5 of which the bottom is a sieve 23, are inserted into the basic container, as shown in Figure 6. Water boiling in the container rises in the tube, overflows the material on the sieve, and flows back into the container. To observe the percolation, the cover 3 may be made, wholly or partially, of translucent material.

As will be apparent from the parts as all assembled in Figure 1, the portable utensil of my invention is very conserving of space, and hence has extraordinary utility in a kitchen wherever space must be conserved, as for example, in airplanes, boats, automobiles and trailers. All types of food preparation, including deep fat frying and baking with top heat, are possible therewith, and whether the basic container is used in the upright or inverted position, the utensil is always stable. As compared to the prior art devices, each for a different food preparation process using heat, the portable utensil of my invention has the marked and startling advantage of requiring only one heating element for all these processes, resulting in lower cost and space conservation.

What I claim is:
1. A portable utensil for the preparation of solid and liquid food by heat comprising a main container having an open top, a flat bottom and a cylindrical wall tapering outwardly from the top to the bottom, an electrical heating element disposed adjacent and outside the bottom, a ring depending from and integral with the bottom of the main container and encircling the heating element, an inverted dish-shaped auxiliary container affixed to the ring and having a diameter at its open end greater than that of the bottom of the main container, the dish-shaped auxiliary container being relatively shallow compared to the main container, a cover adapted to be fitted into the open top of the main container, and a handle attached to the ring having an upper portion at substantially right angles to the axis of the main container, the upper face of the upper portion being coplanar with the open top of the main container, whereby on positioning the utensil with the main container lowermost and the cover removed, the said face assists in maintaining the stability of the utensil in said position.

2. A portable utensil for the preparation of solid and liquid food by heating comprising a main container having an open top, a flat bottom and a cylindrical wall tapering outwardly from the top to the bottom, an electrical heating element disposed adjacent and outside the bottom, a ring depending from and integral with the bottom of the main container and encircling the heating element, an inverted dish-shaped auxiliary container affixed to the ring and having a diameter at its open end greater than the diameter of the bottom of the main container, a cover adapted to be fitted into the open top of the main container, a second pot shaped container having an open top and of somewhat less volume than the main container, the second pot shaped container being fitted into the main container between the open top and the cover, and a second dish-shaped member fitted into the open end of the inverted dish-shaped auxiliary container to form an enclosure wholly separate from that formed by the main container and the cover.

THEODOR STIEBEL.

References Cited in the file of this patent

UNITED STATES PATENTS

| Number | Name | Date |
|---|---|---|
| 919,843 | Fish | Apr. 27, 1909 |
| 1,060,263 | Lamb | Apr. 29, 1913 |
| 1,810,650 | Fay | June 16, 1931 |
| 1,992,843 | Serenberg et al. | Feb. 26, 1935 |
| 2,209,832 | Schurig | July 30, 1940 |
| 2,497,241 | Spigel | Feb. 14, 1950 |
| 2,522,085 | Beckemeyer | Sept. 12, 1950 |

FOREIGN PATENTS

| Number | Country | Date |
|---|---|---|
| 17,453 | Great Britain | July 30, 1913 |